(12) United States Patent
Monty et al.

(10) Patent No.: US 7,296,359 B2
(45) Date of Patent: Nov. 20, 2007

(54) LASER ALIGNMENT SYSTEM AND METHOD

(75) Inventors: Nathan P. Monty, Charlton, MA (US); Kevin L. Armbruster, Chicopee, MA (US); Kenneth A. Lind, Brimfield, MA (US)

(73) Assignee: Videojet Technologies, Washington, DC (US)

( * ) Notice: Subject to any disclaimer, the term of this patent is extended or adjusted under 35 U.S.C. 154(b) by 0 days.

(21) Appl. No.: 11/033,499

(22) Filed: Jan. 12, 2005

(65) Prior Publication Data

US 2006/0085992 A1    Apr. 27, 2006

Related U.S. Application Data

(60) Provisional application No. 60/622,054, filed on Oct. 27, 2004.

(51) Int. Cl.
*G01C 15/00*  (2006.01)
*H01S 3/00*  (2006.01)

(52) U.S. Cl. ............. 33/286; 33/228; 33/DIG. 21; 372/107

(58) Field of Classification Search ............. 33/290, 33/291, 286, 227, 228, DIG. 21; 269/71, 269/73; 372/107; 356/123, 127
See application file for complete search history.

(56) References Cited

U.S. PATENT DOCUMENTS

| | | | |
|---|---|---|---|
| 3,226,830 A | 1/1966 | Everitt | |
| 3,386,043 A | 5/1968 | Marcatili et al. | 398/142 |
| 3,500,242 A * | 3/1970 | Young | 372/33 |
| 3,641,454 A | 2/1972 | Krawetz | |
| 3,772,611 A | 11/1973 | Smith | 372/96 |
| 3,852,684 A | 12/1974 | Roess et al. | 372/19 |
| 3,961,283 A | 6/1976 | Abrams et al. | 372/64 |
| 4,005,374 A | 1/1977 | Levatter et al. | |
| 4,064,465 A | 12/1977 | Hundstad | 372/58 |
| 4,169,251 A | 9/1979 | Laakmann | 372/64 |
| 4,287,482 A | 9/1981 | Wert, III | 372/19 |
| 4,333,242 A * | 6/1982 | Genho, Sr. | 33/227 |
| 4,367,553 A | 1/1983 | Neracher | |
| 4,438,514 A | 3/1984 | Chenausky et al. | 372/64 |
| 4,493,087 A | 1/1985 | Laakman | 372/64 |
| 4,507,786 A | 3/1985 | Dezenberg et al. | |
| 4,577,323 A | 3/1986 | Newman et al. | 372/64 |
| 4,718,173 A * | 1/1988 | Eklund | 33/533 |
| 4,787,090 A | 11/1988 | Newman et al. | 372/82 |
| 4,805,182 A | 2/1989 | Laakmann | 372/82 |
| 4,807,232 A | 2/1989 | Hart | 372/18 |
| 4,807,233 A | 2/1989 | Hart | 372/18 |
| 4,807,234 A | 2/1989 | Hart | 372/18 |
| 4,837,769 A | 6/1989 | Chandra et al. | 372/41 |
| 4,870,654 A | 9/1989 | Cantoni | 372/93 |
| 4,884,282 A | 11/1989 | Bridges | 372/97 |

(Continued)

OTHER PUBLICATIONS

Cheo, Peter K., "Handbook of Molecular Lasers", ISBN 0-8247-7651-8, Series: Optical Engineering, 1987, pp. 170-181, vol. 14, Marcel Dekkter Inc., New York U.S.A.

*Primary Examiner*—G. Bradley Bennett
*Assistant Examiner*—Amy R. Cohen
(74) *Attorney, Agent, or Firm*—Nixon & Vanderhye P.C.

(57) ABSTRACT

Provided is a device/method of alignment of a laser's beam with the laser's support system so that the beam is substantially parallel in a chosen direction with respect to a reference line on the laser's support system.

20 Claims, 6 Drawing Sheets

U.S. PATENT DOCUMENTS

| | | |
|---|---|---|
| 4,956,847 A | 9/1990 | Terai .......................... 372/87 |
| 5,048,047 A | 9/1991 | Kozlovsky et al. ........... 372/92 |
| 5,079,773 A | 1/1992 | Hart et al. .................... 372/18 |
| 5,140,606 A | 8/1992 | Yarborough et al. |
| 5,151,917 A | 9/1992 | Perilloux et al. ........... 372/102 |
| 5,321,717 A | 6/1994 | Adachi ....................... 372/100 |
| 5,327,446 A | 7/1994 | Waynant ...................... 372/61 |
| 5,353,297 A | 10/1994 | Koop et al. ................... 372/64 |
| 5,417,140 A | 5/1995 | Onozuka et al. |
| 5,467,362 A | 11/1995 | Murray .......................... 372/5 |
| 5,508,851 A | 4/1996 | Tachizawa .................. 359/822 |
| 5,600,668 A | 2/1997 | Erichsen et al. .............. 372/87 |
| 5,663,980 A | 9/1997 | Adachi ....................... 372/108 |
| 5,748,663 A | 5/1998 | Chenausky |
| 5,764,505 A | 6/1998 | Mixon et al. |
| 5,864,956 A | 2/1999 | Dong |
| 5,953,360 A | 9/1999 | Vitruk et al. |
| 5,983,510 A * | 11/1999 | Wu et al. ...................... 33/227 |
| 6,052,911 A * | 4/2000 | Davis .......................... 33/286 |
| 6,163,969 A | 12/2000 | Jan et al. |
| 6,185,596 B1 | 2/2001 | Hadad et al. ............... 708/491 |
| 6,192,061 B1 | 2/2001 | Hart et al. .................... 372/87 |
| 6,195,379 B1 | 2/2001 | Jones et al. |
| 6,414,979 B2 | 7/2002 | Ujazdowski et al. |
| 6,427,348 B1 | 8/2002 | Webb |
| 6,453,568 B1 * | 9/2002 | Hymer ......................... 33/276 |
| 6,470,578 B1 * | 10/2002 | Phuly et al. .................. 33/286 |
| 6,513,774 B2 * | 2/2003 | Hailson ................... 248/288.51 |
| 6,573,981 B2 * | 6/2003 | Kumagai et al. .......... 356/4.08 |
| 2002/0131469 A1 | 9/2002 | Vitruk |
| 2003/0058913 A1 | 3/2003 | Shackleton et al. |
| 2004/0218650 A1 | 11/2004 | Monty |

* cited by examiner

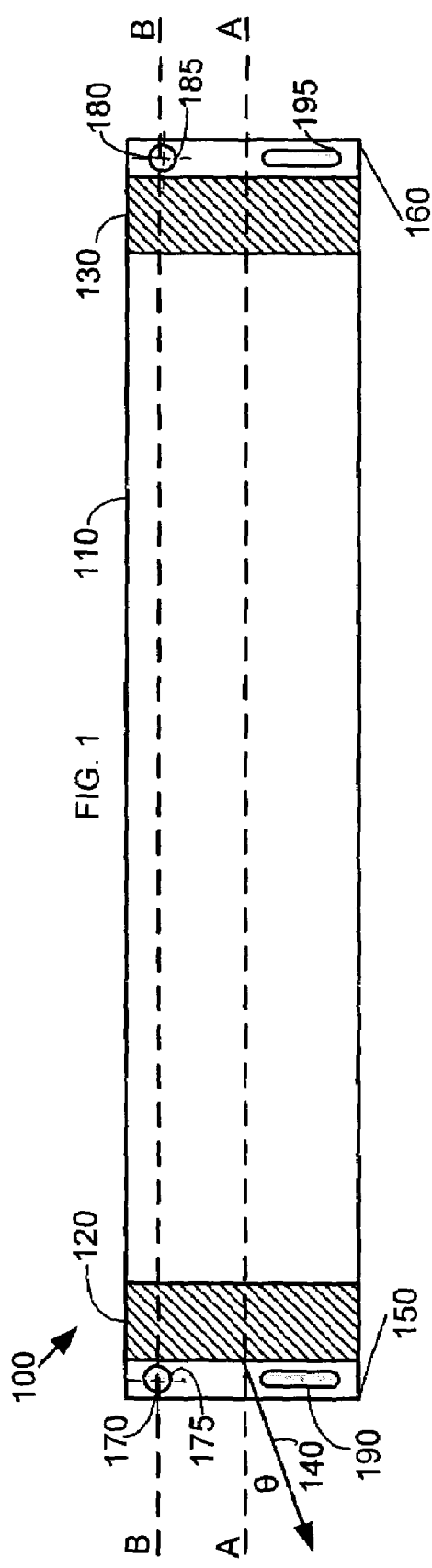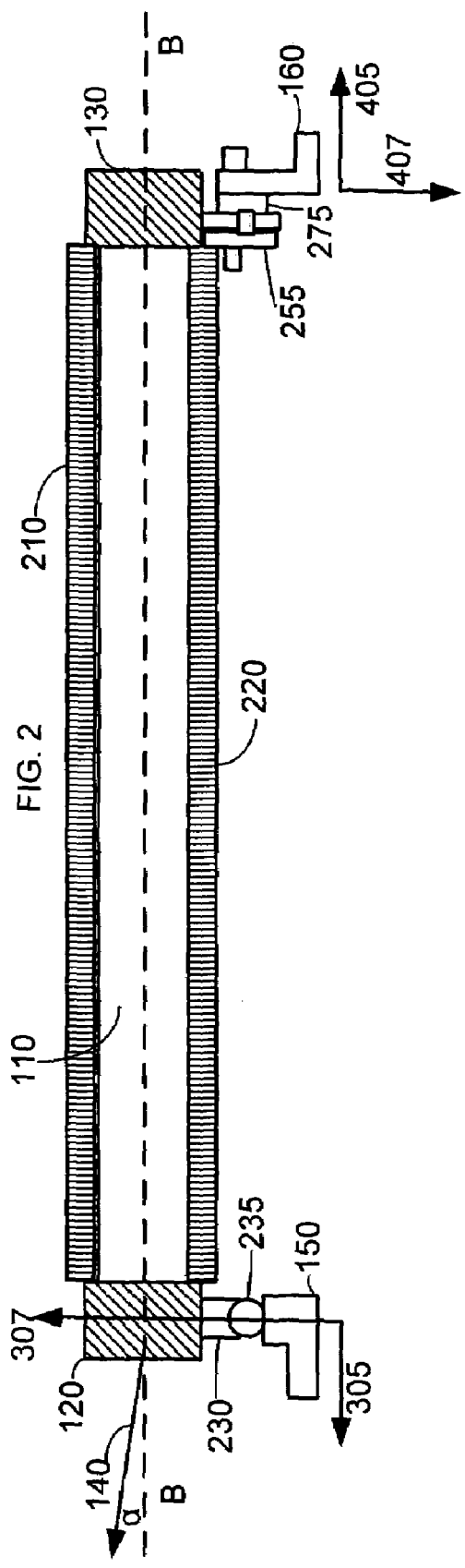

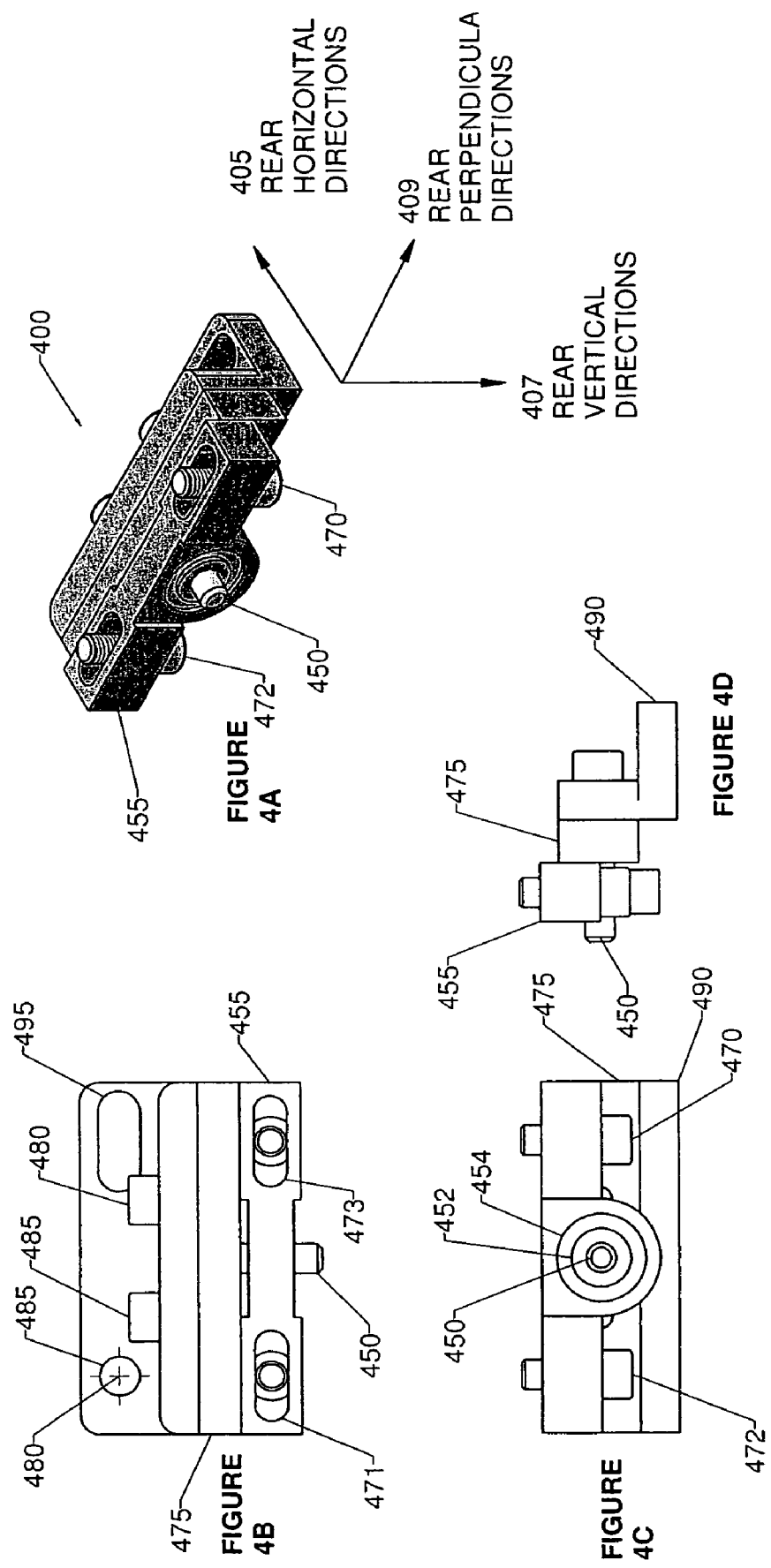

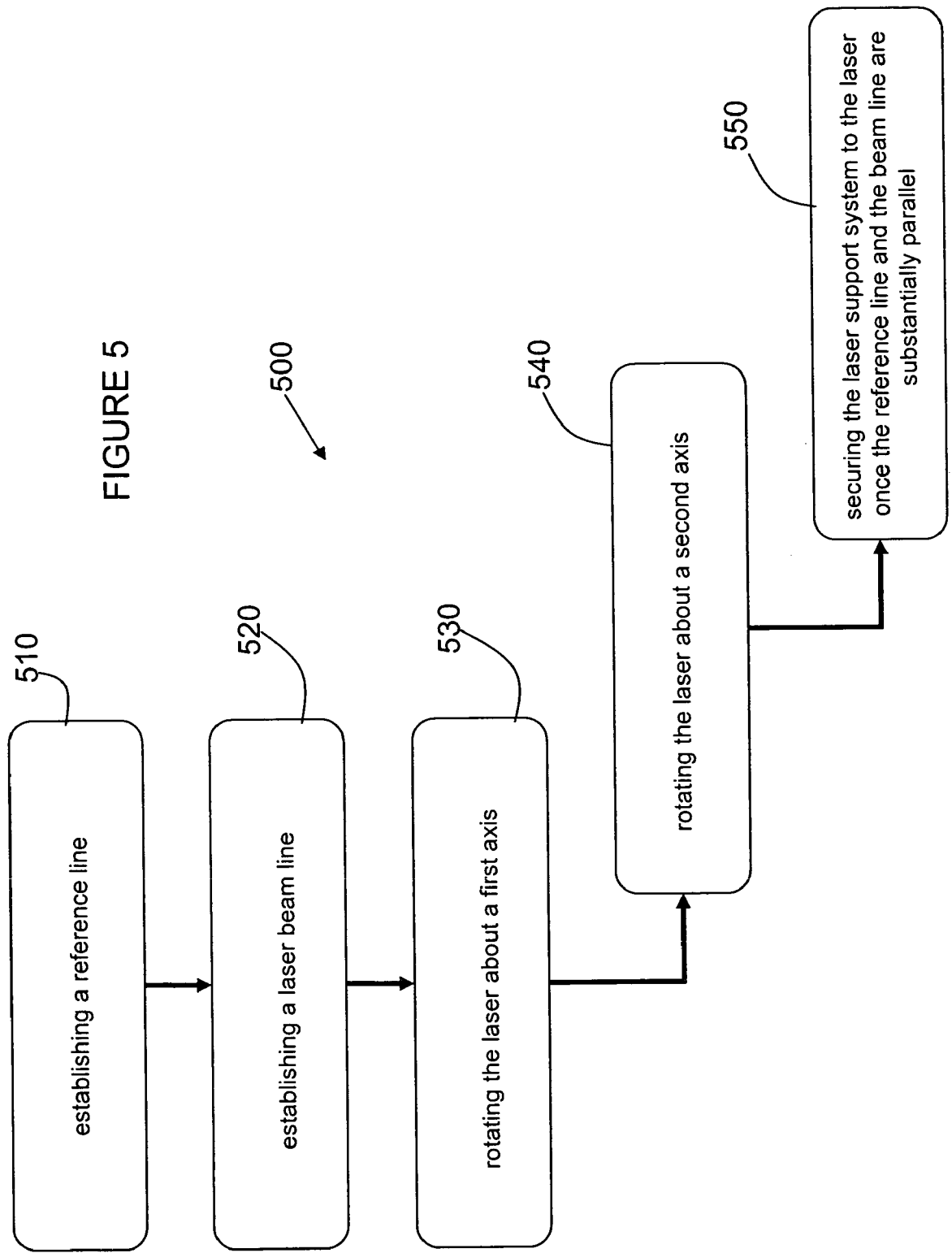

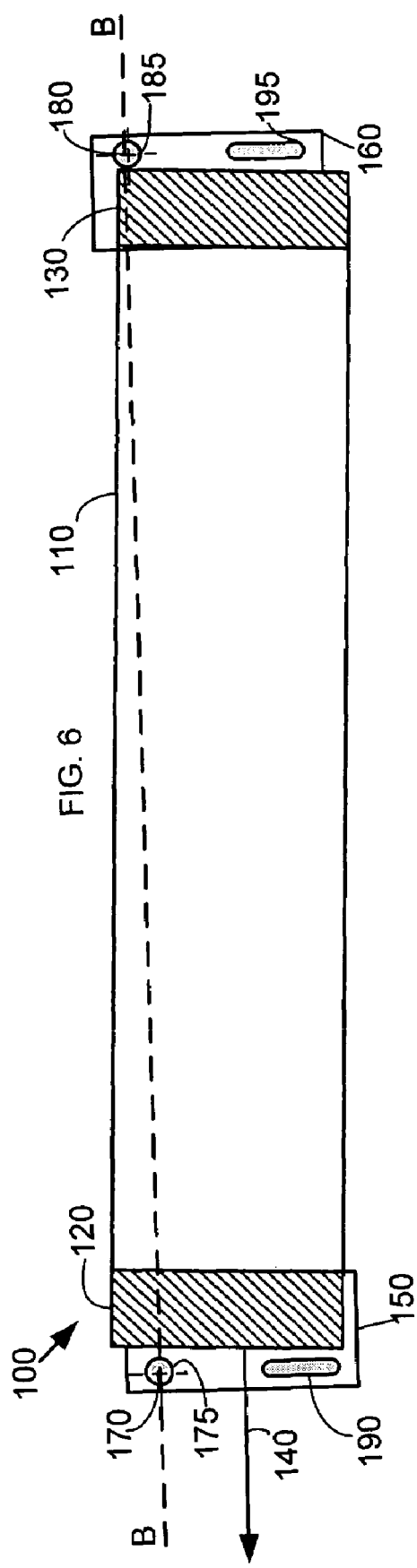

LASER ALIGNMENT SYSTEM AND METHOD

CROSS-REFERENCE RELATED APPLICATIONS

The present application claims priority under 35 U.S.C. § 119(e) to provisional patent application 60/622,054, filed 27 Oct. 2004.

FIELD OF THE INVENTION

The present invention relates to the alignment of lasers, in particular gas lasers and other lasers with physically separate cavity mirrors.

BACKGROUND OF THE INVENTION

Lasers are used for many purposes (e.g. etching, marking, cutting, and other heat or light related uses). For these purposes, alignment of the laser, for example for marking packages, requires alignment of the laser's output beam from the mounted position to the desired location. In conventional gas lasers, such as $CO_2$ lasers, and some other laser types that use physically separate cavity mirrors, the laser beam is often not well aligned with the optical axis of the laser, and therefore not well aligned with the laser module housing the laser. Thus, when a laser in a production environment fails and is replaced with a new laser, some kind of re-alignment of the output beam is usually required. For example, the laser itself can be adjusted by adjusting the alignment of the cavity mirrors, or the laser module can be realigned as a whole so that the output beam points in the desired direction, or the output beam can be redirected by external optical components. This re-alignment is clearly not desirable. In some cases, users are provided with an in situ re-alignment component with a limited adjustment. Thus, when the output beam direction of the new unit diverges too far from center, there is often insufficient adjustment possible to re-align the output beam correctly. In these cases, customers reject the new unit completely and return it to the manufacturer as unusable.

It would thus be desirable to provide a laser module, in particular a gas laser module, in which the variation in output beam direction from unit to unit was minimized, or ideally minimal, so that the amount of beam adjustment needed would be kept low, or eliminated.

SUMMARY OF THE INVENTION

According to the invention there is provided a laser alignment method comprising: establishing a reference line, wherein the reference line is defined by a line intersecting a first datum point and a second datum point, where the first and second datum points are on a laser support system, wherein a laser is moveable with respect to the laser support system; establishing a laser beam line; rotating the laser about a first axis; rotating the laser about a second axis having a different direction of extent than the first axis, wherein the rotation about the first and second axis aligns the laser beam line so that the laser beam line is parallel to the reference line; and securing the laser support system to the laser.

In an alternative of this laser alignment method, instead of rotating the laser, the laser is provided with a wedged output coupler and the output coupler is rotated to steer the beam.

The invention also provides a laser alignment system comprising: front foot assembly, the front foot assembly having a front vertical direction, a front horizontal direction, and a front perpendicular direction, the front perpendicular direction being perpendicular to the front vertical and horizontal directions, where the front foot assembly includes: a top front mounting foot, a bearing, and a front laser foot; and a rear foot assembly, the rear foot assembly having a rear vertical direction, a rear horizontal direction, and a rear perpendicular direction, the rear perpendicular direction being perpendicular to the rear vertical and horizontal directions, where the rear foot assembly includes: a top rear mounting foot, a rear foot adjust, and a rear laser foot, wherein the front laser foot has a front locator associated with a first datum point and the rear laser foot has a rear locator associated with a second datum point, where a reference line is defined as a line passing through the first and second datum points, where the top front mounting foot is rotatable about the front perpendicular direction, the top front mounting foot is rotatable about the front vertical direction, the rear laser foot is rotatable about the rear perpendicular direction and about the rear vertical direction.

The invention also provides a laser assembly comprising a laser module, a front foot assembly attached to a front end of the laser module, and a rear foot assembly attached to a rear end of the laser module, wherein the front foot assembly has a front vertical direction, a front horizontal direction, and a front perpendicular direction, the front perpendicular direction being perpendicular to the front vertical and horizontal directions, where the front foot assembly includes: a top front mounting foot attached to the front end of the laser module, a front laser foot, and a bearing rotatably connecting the top front mounting foot to the front laser foot; and wherein the rear foot assembly has a rear vertical direction, a rear horizontal direction, and a rear perpendicular direction, the rear perpendicular direction being perpendicular to the rear vertical and horizontal directions, where the rear foot assembly includes: a top rear mounting foot attached to the rear end of the laser module, a rear laser foot, and a rear foot adjust interconnecting the top rear mounting foot and the rear laser foot, and wherein the front laser foot has a front locator associated with a first datum point and the rear laser foot has a rear locator associated with a second datum point, where a reference line is defined as a line passing through the first and second datum points, where the top front mounting foot is rotatable about the front perpendicular direction, the top front mounting foot is rotatable about the front vertical direction, the rear laser foot is rotatable about the rear perpendicular direction and about the rear vertical direction.

The invention also provides a laser alignment system comprising: support means for supporting a laser, wherein the laser emits a laser beam; reference means for providing a reference line in or on the support means; alignment means for aligning the laser beam with the reference line; and securing means for securing the support means after aligning the laser beam with the reference line.

Further areas of applicability of embodiments of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

Embodiments of present invention will become more fully understood from the detailed description and the accompanying drawings, wherein:

FIG. 1 is an illustration of the top view of a laser assembly in accordance with at least one exemplary embodiment before alignment;

FIG. 2 is an illustration of the side view of the laser assembly of FIG. 1;

FIGS. 4A-4D are various illustrations of a rear foot assembly in accordance with at least one exemplary embodiment;

FIG. 5 illustrates at least one exemplary method of alignment of the laser with respect to a portion of the laser support system;

FIG. 6 is an illustration of the top view of the laser assembly of FIG. 1 after alignment.

DETAILED DESCRIPTION OF EXEMPLARY EMBODIMENTS OF THE PRESENT INVENTION

Figure 3A:
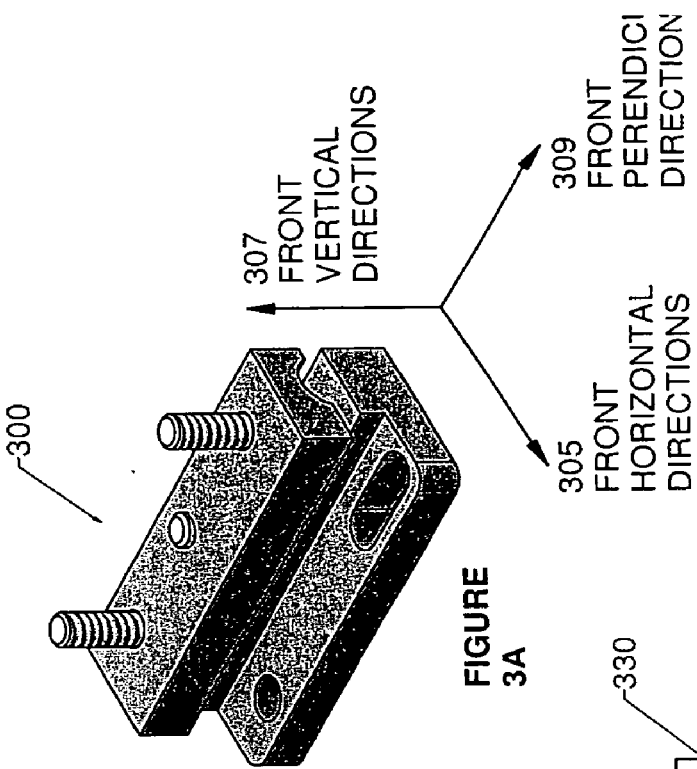
FIGS. 3A-3D are various illustrations of a front foot assembly in accordance with at least one exemplary embodiment.
Figure 3D:
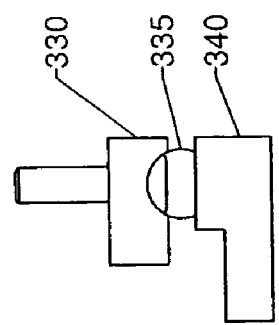
Figure 3B:
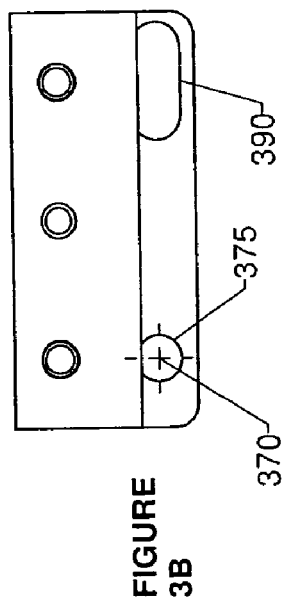
Figure 3C:
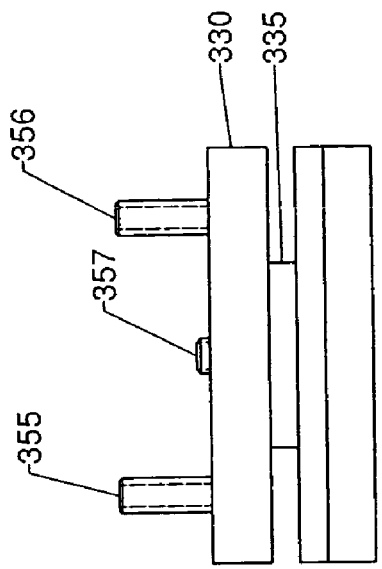

The following description of exemplary embodiment(s) is merely illustrative in nature and is in no way intended to limit the invention, its application, or uses. Alternative embodiments can be devised without departing from the spirit or the scope of the invention.

To avoid obscuring the relevant details, the discussion herein may not discuss all well-known elements associated with laser systems and the alignment of laser systems; however such details are intended to be included within the scope of embodiments.

As mentioned, laser beams are not typically aligned to the laser's optical axis. One way this misalignment can be caused is by an output coupler, which serves as the exit optic. The output coupler's front surface reflects a portion of the laser light through a lasing medium to a rear mirror (e.g. near total reflector) creating the internal optical axis. The lasing medium lies between the output coupler's front surface and the rear mirror. Since optics have thicknesses, the output coupler's rear surface is anti-reflective coated to eliminate reflections off the rear surface back through the lasing medium to the rear mirror. However, when the output beam exits the laser, there is a refraction by the front surface of the output coupler. Since the front and rear surfaces of the output coupler can not be exactly parallel, the output coupler's rear surface refracts the beam such that the beam's exit path is not co-linear with the laser's internal optical axis.

For free space lasers, laser beams are not co-linear with the optical axis, but additionally, the exiting laser beam angle varies greatly from one laser to another. For lasers with free space resonators, the front surface of the output coupler and/or the rear mirror are/is curved. The optical axis' best alignment position between the curve-to-curve or curve-to-flat optics is defined for the maximum power or maximum beam quality position, and due to variances in the manufacturing and mounting of the curved optic(s), the optimal alignment position between the two mirrors points the exit beam at various angles from one laser to another.

The refraction discussed above results in a laser beam line that fails to be aligned with the optical laser axis. When a laser is placed into a manufacturing unit in a warehouse, or other larger system, alignment of the new laser is by trial and error, by moving the placement of the laser, such that no two lasers likely have the same exact placement of a laser's support. In at least one exemplary embodiment the laser beam line is aligned with a reference line on the laser's support, so that upon placement of a laser, in accordance with at least one exemplary embodiment, the laser support can be placed in the same position as a previous laser that has been aligned with its laser's support, with the replacement laser's alignment being substantially the same as the previous laser assembly made in accordance with at least one exemplary embodiment. Thus the laser can be placed, with minimal alignment adjustments if needed.

Embodiments provide at least one method and system for alignment of a laser with its support system. At least one exemplary embodiment provides methods and/or apparatus for aligning a laser beam with references on its laser support system, where references can be any point on the support system.

FIG. 1 is a top view of a laser assembly 100, in accordance with at least one exemplary embodiment. A laser module 110 (illustrated without its cooling fin array for clarity) is shown attached to a front end plate 120 and a rear end plate 130. The front end plate 120 is operatively attached to a front laser foot 150, whereas the rear end plate 130 is operatively attached to a rear laser foot 160. The laser module 110 has a nominal optical axis A-A associated with it. However, the laser's output beam (reference numeral 140) exits the laser module off-axis making an angle $\theta$ to a vertical plane containing reference line B-B and an angle $\alpha$ to a horizontal plane containing reference line B-B (see FIG. 2). It will be appreciated that the angles are shown grossly exaggerated in the figures for illustration purposes. It is also noted that the nominal optical axis A-A is parallel to reference line B-B in this example. It is convenient to have the reference line directed in this way, but not essential. The degree of angular mis-alignment between the output beam and the nominal optical axis of the laser module varies from laser unit to laser unit, which results in the alignment problem discussed above.

In use, as described in the following, the laser module 110 is adjusted with respect to the support system, of which the front laser foot 150 and the rear laser foot 160 are a part, so that the laser beam 140 is re-aligned to travel down a line parallel to the reference line B-B (see FIG. 6 which shows the laser system after alignment). Thus, a new laser assembly can be placed in the same seating on an optical table, using the locators, e.g. holes, of the support system, so that the laser beam 140 travels parallel to the reference line B-B. Note that the nominal optical axis A-A will move as the laser module 110 is adjusted with respect to its support system. The result of adjustment is to have the laser beam 140 aligned with the reference line B-B, or aligned with one or more datum points (e.g. first datum point 170, second datum point 180) on the support system. Upon mounting in a manufacturing unit, or other system, the datum points can be aligned with corresponding datum points on the optical bench in the system's reference system, so that the laser is substantially aligned in the system's reference system.

FIG. 1 shows two datum points, the first datum point 170 and the second datum point 180. In additional exemplary embodiments a datum line can be used. A reference line B-B can be defined by passing a line through both datum points 170 and 180. In the embodiment shown, the first datum point is in the middle of a front laser foot hole 175 that serves as a locator for the first datum point, whereas the second datum point 180 is in the middle of a rear laser hole 185 that serves as a locator for the second datum point. Datum points and/or datum lines in embodiments are not limited to the center of holes, the datum point(s) can be located anywhere on the support system, which can include a front foot assembly 300 (FIG. 3) and a rear foot assembly 400 (FIG. 4). To make further adjustments a front laser slot 190 is included in the front laser foot 150, and a rear laser foot slot 195 in included in a rear laser foot 160.

FIG. 2 illustrates the side view of the laser assembly 100 with attached fin arrays, namely a top cooling fin array 210 and a bottom cooling fin array 220, although fin cooling arrays in the embodiments are not limited to the positions shown in FIG. 2. The laser module 110, front end plate 120, and rear end plate 130 are attached to the support system, which includes a front foot assembly and a rear foot assembly. The front foot assembly shown includes a top front mounting foot 230, a bearing 235, and the front laser foot 150, while the rear foot assembly includes a top rear mounting foot 255, a rear foot adjust block 275, and the rear laser foot 160. Associated with the front foot assembly and the rear foot assembly are fixed coordinate systems with axes 305, 307, 405, and 407 being illustrated. These coordinate systems are best shown in FIGS. 3 and 4 respectively. These axes are stationary while the rotation of the support system is in reference to these axes, although other reference axes can be used within the scope of other embodiments. The side view, FIG. 2, shows the laser beam 140 exiting the front end plate 120, where the projection of the laser beam 140 in the side view plane makes an angle α with the reference line B-B.

FIGS. 3A-3D illustrates a front foot assembly 300 in accordance with at least one exemplary embodiment. The front foot assembly 300 comprises a front laser foot 340, a bearing 335, and a top front mounting foot 330. A first datum point 370 lies in the middle of front laser foot hole 375, with a front laser foot slot 390 in the front laser foot 340. Note as discussed above the first datum point can lie anywhere on the front foot assembly 300. The bearing 335 (e.g. half-hemispherical bearing, spherical bearing) allows movement about a first rotation axis. Likewise a bearing support pin (not visible—but situated in the same bore and below locking grub screw 357) connects the top front mounting foot 330 to the bearing 335 and operatively to the front laser foot 340, and also allows rotation about a second rotation axis. The two mounting mechanisms 355 and 356 (e.g. screws, nails, pins, bolts, and other fastening systems known by those of ordinary skill for fastening the top front mounting foot 330 to a front end plate) fasten the top mounting foot 330 to a front end plate of the laser module (e.g. 130).

Additional mechanical combinations can be used to add various other rotations and translations, for example other connection plates with ball joints, separate adjust plates to translate the spacing between the front laser foot 340 and the top front mounting foot 330, grooves in the front laser foot 340, a cylindrical ball bearing for bearing 335, and other systems as would be known by one of ordinary skill to adjust the angular and translation orientation between the top front mounting foot 330 and the front laser foot 340.

FIGS. 4A-4D illustrates a rear foot assembly 400 in accordance with at least one exemplary embodiment. The rear foot assembly 400 comprises a rear laser foot 490, a rear foot adjust block 475, and a top rear mounting foot 455. A second datum point 480 is located in the middle of a rear laser foot hole 485. Note as discussed above the second datum point can lie anywhere on the rear foot assembly 400 or a datum line can be used. Additional adjustment can be made using a rear laser foot slot 495, in the rear laser foot 490. The rear laser foot 490 is attached to the rear foot adjust block 475, by fastening mechanisms 480 and 485 (e.g. screws, nails, pins, bolts, and other fastening systems known by those of ordinary skill for fastening rear laser foot 490 is attached to the rear foot adjust block 475). The rear adjust block 475 is operatively connected to the top rear mounting foot 455, by a bearing peg 450, which has a bearing peg extension 452 that fits into a bushing 454 (e.g. made of ceramic, brass, plastic, or another appropriate metal). The bearing peg 450, bearing peg extension 452, and the bushing 454 allows a first rotation about the principal or long axis of the bearing peg 450 (axis 405), a second rotation about an axis perpendicular to the top view plane of FIG. 4B (axis 407), and translation along the long axis of the bearing peg 450 (axis 405). Additional mechanical combinations can be used to add various other rotations and translations, for example other connection plates with ball joints, separate adjust plates to translate the spacing between the rear laser foot 490 and the top rear mounting foot 455, grooves in the rear laser foot 490, and other systems as would be known by one of ordinary skill to adjust the angular and translation orientation between the top rear mounting foot 455 and the rear laser foot 490.

In at least one exemplary embodiment the laser support system includes the front foot assembly 300 and the rear foot assembly 400. The front foot assembly 300 can have a first front rotation axis, and a second front rotation axis, where the front foot assembly 300 is operatively connected with a front end plate (e.g. 120) of a laser module or housing (e.g. the combination of 110, 120, and 130) so that the front end plate can rotate about the first and second front rotation axes. In at least one exemplary embodiment a rotation about the first and second front rotation axes can align a laser beam (e.g. 140) with a reference line (e.g. B-B). Additionally exemplary embodiments can have various numbers (e.g. additional or fewer) of front translation and front rotation axis, and the discussion herein should not be interpreted to limit the scope to two front rotation axes.

Likewise, in at least one exemplary embodiment the rear foot assembly 400 can include a first rear rotation axis, a second rear rotation axis, and a rear translation axis, where the rear foot assembly 400 is operatively connected with the rear end plate (e.g. 130) of the laser module or housing, so that that rear end plate 130 can rotate about the first and second rear rotation axis and translate along the rear translation axis. Additional exemplary embodiments can have various numbers (e.g. additional or fewer) of rear translation and rear rotation axis, and the discussion herein should not be interpreted to limit the scope to two rear rotation axes and a rear translation axis.

In at least one exemplary embodiment, the front foot assembly 300 can have directions (axes) associated with the front foot assembly's movement and orientation, for example a front vertical direction 307, a front horizontal direction 305, and a front perpendicular direction 309. In this example the front perpendicular direction 309 can be perpendicular to the front vertical 307 and horizontal 305 directions.

Similarly in at least one exemplary embodiment the rear foot assembly 400 can have directions associated with the rear foot assembly's orientation, a rear vertical direction 407 (from top to bottom of the page in FIG. 4D), a rear horizontal direction 405 (from left to right of the page in FIG. 4D), and a rear perpendicular direction 409 (from top to bottom of the page in FIG. 4B). In this example the rear perpendicular direction 409 can be perpendicular to the rear vertical 407 and horizontal 405 directions.

In at least one exemplary embodiment the top front mounting foot 330 can rotate about the front perpendicular direction 309 and/or the front vertical direction 307 and/or the front horizontal direction 305. For example, in the front foot assembly 300 shown in FIG. 3A, the top front mounting foot 330 can rotate about the bearing support pin, and about bearing 335. In at least one exemplary embodiment the rear laser foot 490 can rotate about the rear perpendicular direction 409 and/or the rear vertical direction 407 and/or the rear horizontal direction 405. For example, in the rear foot assembly 400 shown in FIG. 4A, the top rear mounting foot 455 can rotate about the bearing peg 450 and rotate a slight angle $\psi$ about the rear vertical direction 407 by the flexibility of the bearing peg extension 452 in the bushing 454, which could be made up of soft material (e.g. silicon, plastic) or the bearing peg extension 452 can be a ball bearing connected to the bearing peg 450 seated in the bushing 454 allowing rotation about several axes. Note a similar bearing arrangement can be devised for the front foot assembly by copying such rear foot assembly features. Additionally the example shown in FIG. 4A allows translation in the rear horizontal direction 405 by movement of the bearing peg in and out of the bushing 454. Again features shown for the front foot assembly can be adopted for the rear foot assembly and vice versa.

In at least one exemplary embodiment the rear laser foot 490 can be attached to the rear foot adjust block 475 so that there is no relative rotation or translation (e.g. bolted, soldered, welded, glued, latched, and similar other attachment methods know by those of ordinary skill in the arts to limit relative motion between the rear laser foot 490 and the rear foot adjust block 475). The bearing peg 450 can be attached to the rear foot adjust block 475. In further variations the top rear mounting foot 455 can include a ball joint, which can be seen as the bearing peg extension 452, in this case not connected to the bearing peg 450. The bearing peg extension (e.g. ball joint) can have a hole through which the bearing peg 450 passes. In such an exemplary embodiment the bearing peg 450 of the rear foot adjust block 475 can pass through the hole in the ball joint, so that the ball joint can support a translational motion in and out of the hole by the bearing peg 455. Additionally the movement of the ball joint and bearing peg 455 provide a mechanism for relative rotation about several rotation axes.

FIG. 5 illustrates at least one exemplary embodiment where a method 500 of alignment comprises, establishing a reference line 510, where the reference line is defined by a line intersecting a first datum point and a second datum point, where the first and second datum points are on a laser support system, where a laser is moveable with respect to the laser support system. The reference line can define the intersection on two planes a first reference line plane and a second reference line plane. The laser emits a beam, which establishes a laser beam line 520 along the centerline of the laser beam (e.g. 140). The laser beam line may not be parallel with the reference line (e.g. B-B) or the optical axis (e.g. A-A) and thus alignment of the laser beam with the reference line is desirable in at least one exemplary embodiment. In at least one exemplary embodiment, to align the laser beam line to be substantially parallel to the reference line, the laser can be rotated about a first axis 530 so that a first projection of the laser beam line in the first reference plane is parallel to the reference line. For example with reference to FIG. 3A, the rotation can be about the front vertical direction 307, so that the angle $\theta$ is minimized.

If further alignment is needed, then a rotation about a second axis 540 can occur so that a second projection of the laser beam line in the second reference plane is substantially parallel to the reference line. For example with reference to FIG. 3A, the rotation can be about the front perpendicular direction 309, so that the angle $\alpha$ is minimized. After alignment of the laser beam line to be substantially parallel to the reference line, the laser support system can be secured to the laser 550 so that no substantial variation in relative movement occurs between the laser and it's support system. The rotation and translation ability in the rear and foot assemblies can be manipulated to line up the front laser foot hole 375, the rear laser foot hole 485, the front laser foot slot 390 and the rear laser foot slot 495 with conventional optical table holes such that the laser assembly can be set in optical table holes, with the laser module 110 slightly skewed, so that the laser beam travels parallel to the reference line B-B.

FIG. 6 shows a skewed laser that has been aligned with the laser support assembly adjusted to align the mounting. Once alignment has been achieved the various pieces are secured with respect to each other to minimize further rotations and translations.

A specific example of an alignment method is now described. The aim of the alignment method is to make a line defined by connecting the dowel hole in the front laser foot to the hole in the rear laser foot (reference line B-B) to be parallel (co-linear is not required) to the line 140 defined by the output beam that exits the laser. This is performed through two axes of movement. Currently, it is considered that the easiest way to perform the alignment in practice is in conjunction with a testing jig, such as an optical table, and a projection panel for the laser beam with a target, such as a wall with a target point marked by a spot and/or one or more target rings marked on it. The testing jig has two dowels upstanding from its surface in positions for receiving the locator holes 375 and 485 in the front and rear foot assemblies respectively. The alignment method currently used involves the following steps:

1. Place the laser assembly in the jig with the locator hole 375 of the front laser foot 340 in the front dowel.
2. Slew the back of the laser assembly left and right rotating around the front dowel (i.e. about the vertical axis defined by the first datum point 370) until a laser beam spot on the projection panel is aligned horizontally with the target point, i.e. so that the spot lies on a vertical line through the target point.
3. Move the rear laser foot 490 and set it in the testing jig rear dowel location. Lock down the first set of locking screws 470, 472 in their adjustment slots.
4. Tilt the laser up and down about the front foot bearing 335 to vertically align the laser beam spot on the projection panel so that it lies on the target point.
5. Lock down the second set of screws 480, 485 of the rear laser foot in their adjustment slots, and lock down the screw 357 of the front laser foot to lock the front laser foot bearing 335.

Preferably there is a spherical bearing in the rear laser foot (not shown). The spherical bearing provides two functions. First it allows for a tilt that matches the tilt in the front laser foot bearing 335. Second it can have a through hole through which passes the peg 450 on which the laser module is mounted, so that thermally induced extension or contraction of the laser module in use can be accommodated, avoiding distortion of the laser module not along the optical axis. This keeps the laser aligned as it heats.

The laser support system and components (e.g. 300, 400) can be composed of various materials (e.g. metals. composites, ceramics, plastics, silicon and other materials one of ordinary skill would know) and made from various processes (extrusions, molding, milling, and other manufacturing processes known by one of ordinary skill) and the discussion herein fails to limit the scope of the invention to any particular material composition or material process.

Figure 7:
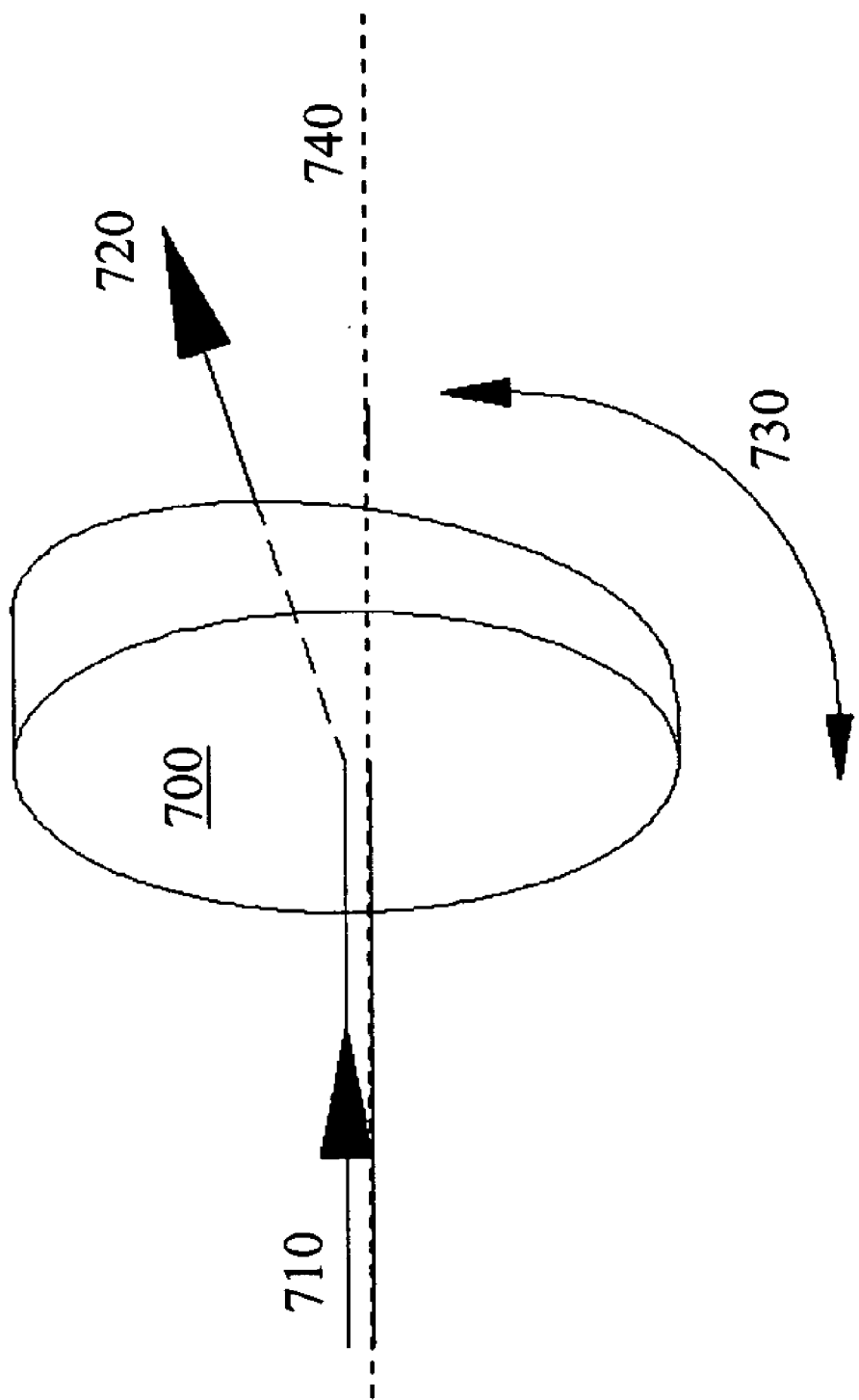
FIG. 7 shows a wedged output coupler used for beam steering in one axis in an alternative embodiment.

FIG. 7 shows a wedged output coupler 700 used for beam steering in one axis 740 in an alternative embodiment. In this embodiment, the laser 710 is provided with a wedged output coupler 700. This is a component well known in the art. The wedged output coupler 700 is rotatably mounted and by rotating it 730 (see double headed arrow with curved interconnecting line) the output beam 720 can be steered to provide alignment of the beam in one axis. The further alignment in the second axis, and optionally the third axis, is performed as in the main embodiment described further above by rotation or translation of the laser module.

Numerous modifications and variations of the present invention are possible in light of the above teachings. It is therefore understood that within the scope of appended claims, the invention may be practiced otherwise than as specifically reflected in the examples provided and such practice is intended to lie within the scope of the invention.

What is claimed is:

1. A laser alignment method comprising:
    establishing a reference line, wherein the reference line is defined by a line intersecting a first datum point and a second datum point, wherein the first and second datum points are on opposing ends of a laser support system so as to define the reference line as being internal to the laser support system, wherein a laser is moveable with respect to the laser support system;
    establishing a laser beam line;
    rotating the laser, or a wedged output coupler thereof, about a first axis;
    rotating the laser about a second axis having a different direction of extent than the first axis, wherein the rotation about the first and second axes aligns the laser beam line so that the laser beam line is parallel to the reference line; and
    securing the laser support system to the laser.

2. The laser alignment method of claim 1, further comprising freely moving the laser along one direction with respect to a portion of the laser support system.

3. The method of claim 1, wherein the step of rotating about the first axis aligns a first projection of the laser beam line parallel to the reference line.

4. The method of claim 3, wherein the step of rotating about the second axis aligns a second projection of the laser line parallel to the reference line.

5. The method of claim 4 wherein the first axis is perpendicular to the second axis.

6. The method of claim 5, further comprising:
    translating the laser with respect to the laser support system along the first axis.

7. The method of claim 5, further comprising:
    translating the laser with respect to the laser support system along the second axis.

8. The method of claim 5, further comprising:
    translating the laser with respect to the laser support system along a third axis, the third axis perpendicular to the first and second axes.

9. The method of claim 5, further comprising:
    rotating the laser about a third axis, the third axis perpendicular to the first and second axes.

10. The method of claim 1, wherein the first axis extends vertically and the second axis extends horizontally.

11. The method of claim 1, wherein the first and second axes are orthogonal to each other and lie in a plane that is orthogonal to the reference line.

12. The method of claim 11, wherein the plane intersects or is proximal to the first datum point and the first and second axes intersect the first datum point or pass proximal to the first datum point.

13. A laser alignment method comprising:
    establishing a reference line, wherein the reference line is defined by a line intersecting a first datum point and a second datum point, where the first and second datum points are on a laser support system, wherein a laser is moveable with respect to the laser support system;
    establishing a laser beam line;
    rotating the laser, or a wedged Output coupler thereof, about a first axis;
    rotating the laser about a second axis having a different direction of extent than the first axis, wherein the rotation about the first and second axes aligns the laser beam line so that the laser beam line is parallel to the reference line;
    securing the laser support system to the laser;
    wherein the step of rotating about the first axis aligns a first projection of the laser beam line parallel to the reference line;
    wherein the step of rotating about the second axis aligns a second projection of the laser line parallel to the reference line;
    wherein the first axis is perpendicular to the second axis; and
    wherein the laser support system comprises:
        a front foot assembly; and
        a rear foot assembly, wherein the front foot assembly has a first front rotation axis, a second front rotation axis, and a front translation axis, wherein the front foot assembly is operatively connected with a first end of the laser so that the first end can rotate about the first and second front rotation axes and translate along the front translation axis.

14. The method of claim 13, wherein the rear foot assembly has a first rear rotation axis, a second rear rotation axis, and a rear translation axis, wherein the rear foot assembly is operatively connected with a second end of the laser so that the second end can rotate about the first and second rear rotation axes and translate along the rear translation axis.

15. A laser alignment system comprising: a laser module comprising laser beam emitting means and comprising:
    a front foot assembly, the front foot assembly having a front vertical direction, a front horizontal direction, and a front perpendicular direction, the front perpendicular direction being perpendicular to the front vertical and horizontal directions, wherein the front foot assembly includes:
        a top front mounting foot,
        a bearing, and
        a front laser foot; and
    a rear foot assembly, the rear foot assembly having a rear vertical direction, a rear horizontal direction, and a rear perpendicular direction, the rear perpendicular direction being perpendicular to the rear vertical and horizontal directions, wherein the rear foot assembly includes:
        a top rear mounting foot,
        a rear foot adjust, and
        a rear laser foot, wherein the front laser foot has a front locator associated with a first datum point and the rear laser foot has a rear locator associated with a second datum point, wherein a reference line is defined as a line passing through the first and second datum points, wherein the top front mounting foot is rotatable about the front perpendicular direction, the top front mounting foot is rotatable about the front vertical direction, the rear laser foot is rotatable about the rear perpendicular direction and about the rear vertical direction and, wherein rotation about the vertical and perpendicular aligns a laser beam line emitted from the laser module so that laser beam line is parallel to the reference line.

16. The laser alignment system of claim 15, wherein the rear laser foot is rotatable about the rear horizontal direction.

17. The laser alignment system of claim 16, wherein a pin is attached to the rear foot adjust, and wherein the rear laser foot and the rear foot adjust are attached and do not rotate or translate with respect to each other after attachment.

18. The laser alignment system of claim 17, wherein the top rear mounting foot includes a ball joint, and the ball joint has a hole through the ball joint.

19. The laser alignment system of claim 18, wherein the pin passes through the hole of the ball joint and is translatable in the hole.

20. A laser assembly comprising a laser module, a laser beam emitting means, a front foot assembly attached to a front end of the laser module, and a rear foot assembly attached to a rear end of the laser module, wherein
the front foot assembly has a front vertical direction, a front horizontal direction, and a front perpendicular direction, the front perpendicular direction being perpendicular to the front vertical and horizontal directions, wherein the front foot assembly includes:
  a top front mounting foot attached to the front end of the laser module,
  a front laser foot, and
  a bearing rotatably connecting the top front mounting foot to the front laser foot; and wherein
the rear foot assembly has a rear vertical direction, a rear horizontal direction, and a rear perpendicular direction, the rear perpendicular direction being perpendicular to the rear vertical and horizontal directions, wherein the rear foot assembly includes:
  a top rear mounting foot attached to the rear end of the laser module,
  a rear laser foot,
  and a rear foot adjust interconnecting the top rear mounting foot and the rear laser foot, and wherein
the front laser foot has a front locator associated with a first datum point and the rear laser foot has a rear locator associated with a second datum point, wherein a reference line is defined as a line passing through the first and second datum points, wherein the top front mounting foot is rotatable about the front perpendicular direction, the top front mounting foot is rotatable about the front vertical direction, the rear laser foot is rotatable about the rear perpendicular direction and about the rear vertical direction and, wherein rotation about the vertical and perpendicular direction aligns a laser beam line emitted from the laser module so that the laser beam line is parallel to the reference line.

* * * * *